(12) United States Patent
Wett

(10) Patent No.: US 12,319,600 B2
(45) Date of Patent: Jun. 3, 2025

(54) SEWAGE TREATMENT PLANT

(71) Applicant: Bernhard Wett, Innsbruck (AT)

(72) Inventor: Bernhard Wett, Innsbruck (AT)

( * ) Notice: Subject to any disclaimer, the term of this patent is extended or adjusted under 35 U.S.C. 154(b) by 412 days.

(21) Appl. No.: 17/789,902

(22) PCT Filed: Dec. 29, 2020

(86) PCT No.: PCT/AT2020/060487
§ 371 (c)(1),
(2) Date: Jun. 29, 2022

(87) PCT Pub. No.: WO2021/134109
PCT Pub. Date: Jul. 8, 2021

(65) Prior Publication Data
US 2023/0032106 A1 Feb. 2, 2023

(30) Foreign Application Priority Data

Dec. 30, 2019 (AT) .............. A 51159/2019

(51) Int. Cl.
*B01D 21/00* (2006.01)
*B01D 21/02* (2006.01)
(Continued)

(52) U.S. Cl.
CPC ............ *C02F 3/12* (2013.01); *B01D 21/0003* (2013.01); *B01D 21/0087* (2013.01); *B01D 21/10* (2013.01); *B01D 21/2444* (2013.01); *B01D 21/245* (2013.01); *C02F 2001/007* (2013.01); *C02F 3/085* (2013.01); *C02F 2203/006* (2013.01); *C02F 2301/022* (2013.01)

(58) Field of Classification Search
CPC ............ B01D 21/0087; B01D 21/2444; B01D 21/245; C02F 3/12
See application file for complete search history.

(56) References Cited

U.S. PATENT DOCUMENTS 2,574,685 A 11/1951 Baxter et al.
2,989,186 A 6/1961 Weis
(Continued)

FOREIGN PATENT DOCUMENTS

FR 2448512 A1 9/1980
GB 1235948 A 6/1971

OTHER PUBLICATIONS

Zemlyak—FRE 2448512 A1—Jan. 29, 1974 (Year: 1974).*

*Primary Examiner* — Bradley R Spies
(74) *Attorney, Agent, or Firm* — Dykema Gossett PLLC

(57) ABSTRACT

Various aspects of the present disclosure are directed to sewage treatment plants and methods of operating sewage treatment plants. In one example embodiment, the sewage treatment plant includes a clarifier having an aeration region with a vent opening to blow in oxygenous gas for mixing water to be clarified and a settling region with an outlet. The sewage treatment plant further includes a wall system that delimits the at least one aeration region from the at least one settling region by the wall system. The wall system has a channel system which has at least one first opening leading to the aeration region in the region of the water level and a sludge removal device of the channel system in the region of a lower wall of the clarifier for transporting solids-rich water from the settling region into the aeration region.

23 Claims, 1 Drawing Sheet

(51) Int. Cl.
_B01D 21/24_ (2006.01)
_C02F 3/12_ (2023.01)
_C02F 1/00_ (2023.01)
_C02F 3/08_ (2023.01)

(56) References Cited

U.S. PATENT DOCUMENTS

| | | |
|---|---|---|
| 3,161,590 A | 12/1964 | Weis et al. |
| 3,168,465 A | 2/1965 | Kraus et al. |
| 3,173,866 A * | 3/1965 | Lefton .................. C02F 3/1242 210/197 |
| 3,401,797 A | 9/1968 | Dufournet |
| 3,788,477 A | 1/1974 | Love |

* cited by examiner

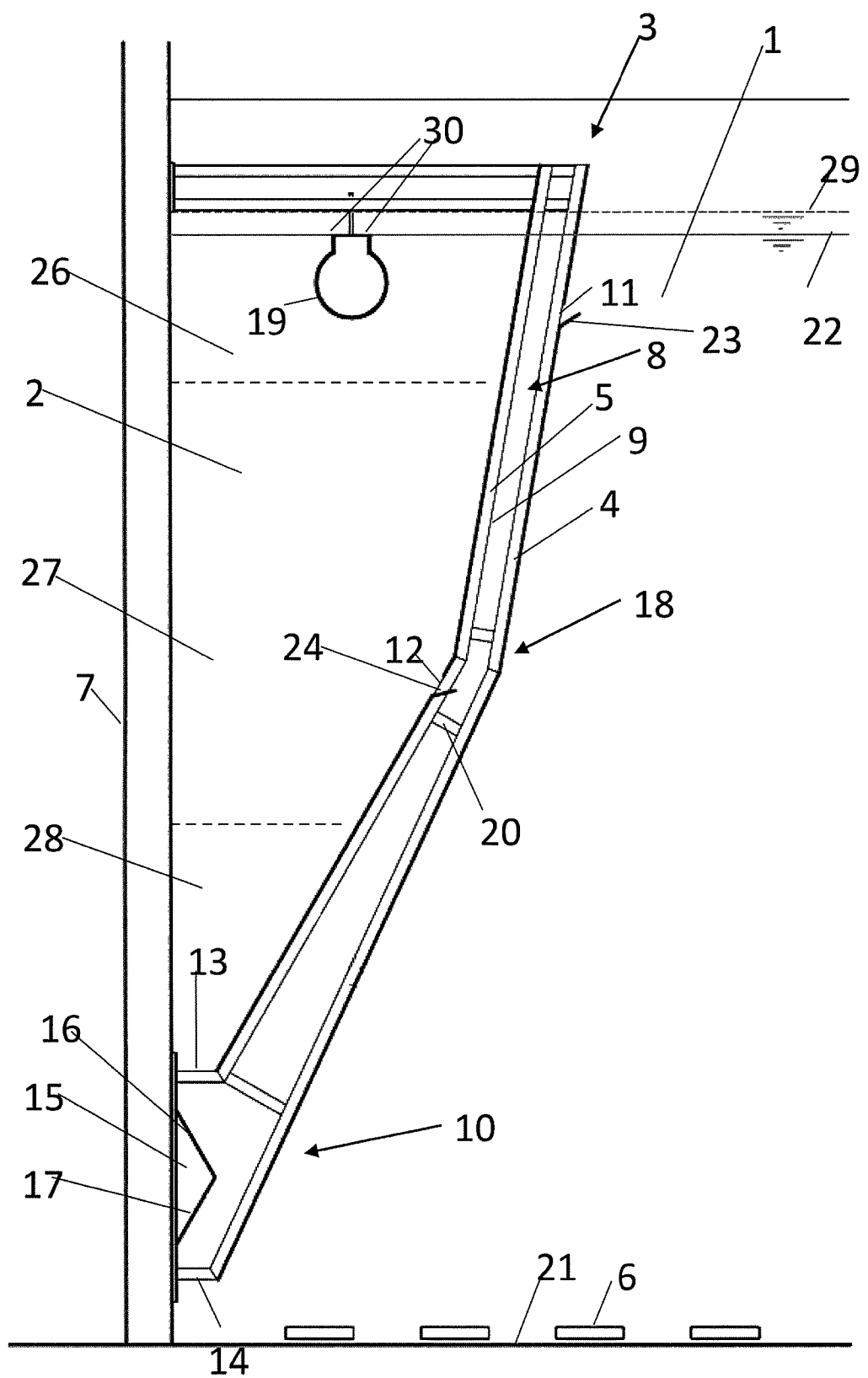

SEWAGE TREATMENT PLANT

CROSS-REFERENCE TO RELATED APPLICATION

This application is a national stage filing based upon International application No. PCT/AT2020/060487, filed 29 Dec. 2020, which claims the benefit of priority to Austria application No. A 51159/2019, filed 30 Dec. 2021.

BACKGROUND

The invention relates to a sewage treatment plant having at least one clarifier, wherein the clarifier has at least one aeration region with at least one vent opening for blowing in oxygenous gas for mixing water to be clarified and at least one settling region with at least one outlet, wherein the aeration region is delimited from the settling region by at least one wall system, and wherein the wall system has a channel system, which has at least one first opening leading to the aeration region in the region of the water level and a sludge removal device of the channel system in the region of a lower wall of the clarifier for transporting solids-rich water from the settling region into the aeration region, wherein the sludge removal device has at least one third opening leading to the settling region and a fourth opening facing the aeration region.

It also relates to a method for operating a sewage treatment plant, wherein water to be treated is aerated in at least one clarifier in an aeration region, is settled in a settling region delimited from the aeration region, and the water is discharged via an outlet in the settling region, and wherein, for this purpose, water is guided from an area of the aeration region close to the water level into a settling region via a first opening in a channel system, and solids-rich water is transported from the settling region into the aeration region via a sludge removal device of the channel system, wherein solids-rich water from the settling region is fed into the channel system via a third opening of the sludge removal device and out of the channel system through a fourth opening through the first wall, wherein a deflector directs gas entering via the fourth opening away from the third opening.

Clarifiers of the type described mix the water by gas introduction in order to evenly distribute solids contained therein, which is mainly sludge. At the same time, the introduction of air or other oxygenous gases can provide oxygen for aerobic bacteria that break down biological substances. The solids content should be as low as possible when the water is discharged. Therefore, settling regions are particularly useful, in which the mixed water can settle, solids can sink slowly and the clarified, low-solids water can be discharged. In the process, a solids-rich portion of water forms, i.e., sludge, which is to be returned to the intermixing region. The water can be discharged during mixing, i.e. while gas is being injected, or the gas injection can be interrupted while the water is being discharged.

U.S. Pat. No. 2,574,685 A1 describes a sewage treatment plant, wherein a first wall facing the aeration region has openings in the area of the water surface and in the area of the lower wall of the clarifier. A second wall facing the settling region is arranged in the upper region of the first wall and interrupts the flow of water substantially in the upper half of the clarifier. Thus, a channel system is formed between the two walls. When air is injected, water is directed through the upper opening of the first wall between the walls into a lower area of the settling region where it can settle and the solids can slowly sink. Settled, compacting solids can be transported as sludge through the lower opening of the first wall into the aeration region. A disadvantage, however, is that in the case of strong intermixing, especially when gas is injected near the first wall, gas bubbles are flushed through the lower opening of the first wall into the settling region. This interferes with the settling of the solids and leads to an increase in the settling time of the solids and a reduced efficiency and lower water flow rate per time. In addition, the proportion of solids in the discharged or effluent water is increased, which can lead to problems in further clarification processes.

In U.S. Pat. No. 3,161,590 A1, an alternative embodiment is shown in which the second wall is guided almost to the lower wall and a deflector is arranged on the side wall. The deflector, the opening of the second wall and the opening of the third wall are thus part of a sludge removal device. The sludge is thus guided from the settling region into the aeration region via this sludge removal device. However, the deflector prevents gas bubbles from entering the settling region. A disadvantage, however, is that water from the lower area of the basin is thus led into the settling region. This water is usually particularly rich in solids, which prolongs the settling time in the settling tank until sufficiently low-solids water is available in the upper area of the settling tank. In addition, this flow causes solids to be entrained by the inflow on its way from the settling region to the aeration region and to be carried back into the settling region, causing additional solids to be carried into the settling region.

In U.S. Pat. No. 2,989,186 A1 a sewage treatment plant is disclosed which has a wall system comprising a first opening to the aeration region and a sludge removal device. In this case, the wall facing the settling region is designed shorter in the area of the sludge removal device, so that low-solids water can flow through the first opening through the wall system via the sludge removal device into the settling region. This leads to turbulence of the already settled solids, to a prolonged settling time and thus to a reduced water throughput.

In order to increase the settlement area for microbial growth, carrier means in the form of sinking, floating or floating solid objects can be used in such sewage treatment plants. Microorganisms can settle on their surface and thus form a biofilm. In such so-called moving bed processes, improved clarification is thus achieved. These carrier means, which are also known as carriers, are usually injected into the treatment plant in the form of wheel-like or spherical, possibly spongy plastic elements. To discharge the treated water, grids are provided at the outlets to retain the carriers. Due to the flow, a buildup of the carrier media can occur in the area of the grids.

It is therefore the object of the invention to provide a sewage treatment plant and a method for operating a sewage treatment plant with an improved water throughput.

SUMMARY OF THE INVENTION

According to the invention, this object is solved in that the channel system has a second, central opening leading to the settling region below the first opening and above the sludge removal device.

It is also solved by guiding the near-surface water into the settling region via a second opening below the first opening and above the sludge removal device.

This allows water to flow from the first opening via the channel system into the settling region without disturbing the recirculation of solids-rich water into the aeration region. On the one hand, this allows water with a particularly low solids content to flow into the settling region from the area of the aeration region near the water surface. On the other hand, solids-rich water can be discharged via the sludge removal device without solids being entrained by the flow above. This reduces the amount of solids in the settling region, accelerates the sinking of the solids and thus enables particularly rapid clarification of the water in the settling region.

In this context, directional or local indications such as bottom, top, horizontal or vertical are assumed to refer to a sewage treatment plant in the intended position of use. This means that the lower wall, i.e. the bottom of the clarifier, is essentially opposite the water level.

If gas is introduced via the vent openings, the water of the aeration region is mixed and at the same time the water level of this area is increased and its density is lowered. At the same time, the water level, volume and density in the settling region initially remain essentially unchanged. The resulting pressure difference between these areas thus causes water from the aeration region to flow through the first opening into the channel system and through the second opening into the settling region. At the same time, water from the settling region is discharged in the lower area through the sludge removal device.

There is also an advantageous pressure distribution: Near the surface of the aeration region, the rise in water level due to aeration causes an increase in pressure that drives the low-solids water into the first opening. Near the bottom, this pressure difference is balanced by the density difference between aerated and non-aerated water, and thus no inflow from below is caused by the sludge removal device, and thus the gravimetric sinking of the solids is not disturbed. This causes low-solids water to flow into the settling region and favors the removal of solids-rich water.

It is particularly advantageous if the wall system is designed as a double wall and if the first opening is arranged on a first wall facing the aeration region and the second opening is arranged on a second wall facing the settling region. This design is stable and cost-efficient.

The invention is particularly advantageous when using moving bed processes or moving bed sewage treatment plants. This is because, since the carrier means generally have a higher density than water, they are kept in suspension by mixing or aeration and sink in settled zones.

To prevent carrier means from entering the settling region, at least the first opening can be provided with a retaining grid. This ensures that no carrier means can enter the settling region with a very high degree of certainty. The retaining grid preferably has a mesh size, i.e. clear mesh spacing, of 1 cm to 3 cm or larger. This means that the flow of water is not impeded, but the carrier means are retained. Depending on the nature of the carrier means, other mesh sizes may also be advantageous. Preferably, the first opening has a retaining grid, while the fourth opening is free of a retaining grid. This prevents the carrier means from entering the settling region, but solids can be returned to the aeration region without any problems. The first and second walls can also be designed as one wall, inside which the channel system is arranged. Alternatively, for example, only one wall with piping forming the channel system can be provided.

Furthermore, it may be advantageous if at least the second wall at least below the second opening has a slope of between 50° and 70°, preferably between 55° and 65°. In other words, it extends at an angle between 50° and 70°, preferably between 55° and 65° to the horizontal substrate or water level. Such a slope increases the cross-sectional area of the settling region in the direction of the water level. Sinking solids do not remain on the sloping second wall, but slide further down. Thus, the solids are collected and further concentrated. Preferably, the sludge removal device is arranged at the lowest point, i.e. at the lower end of the second wall.

It is particularly advantageous if the second opening is arranged at the level of a sedimentation zone of the settling region or water is introduced through the second opening into a sedimentation zone of the settling region. Due to the flow calming of the water in the settling region, this area can be roughly divided into three zones. At the top, a clear zone is formed with particularly low-solids water, which is preferably discharged via the outlet. Below this is a sedimentation zone in which the solids increasingly sink by gravity to form the sludge zone below. This sludge zone is particularly rich in solids and the water-solids mixture of this zone is preferably transported away by the sludge removal device.

By introducing the water into the sedimentation zone, on the one hand the clear water of the clear zone is not contaminated by the incoming, solids-rich water. At the same time, the already settled, solids-rich water of the sludge zone is not agitated again. In the sedimentation zone, the inflowing water can calm down and the solids begin to sink.

In a preferred embodiment, it is provided that in the area of the first opening and at least below the first opening, a first guide member is arranged which extends away from the wall system and in the direction of the aeration region. On the one hand, this prevents gas bubbles rising from below from entering the aeration region into the channel system and negatively influencing the flows there. On the other hand, this promotes the introduction of water from the aeration region that is particularly close to the water surface. This water is particularly low in solids.

Accordingly, it is also advantageous if a second guide member is arranged in the region of the second opening and at least below the second opening, which extends away from the wall system and in the direction of the first wall. This prevents the penetration of air bubbles from the channel system into the settling region and promotes the inflow of the water flowing in through the first opening.

The guide members preferably face in the direction of the surface. They improve the inflow of water closer to the surface through the openings and at the same time direct water and air bubbles away from the openings from further down and from the settling region. The rising air bubbles on the side of the aeration region along the inclined first wall cause a flow roll that pulls solids-rich water out of the fourth opening and guides it toward the water surface, preventing sedimentation. If carrier materials are used, then this flow roller causes the first inlet opening to be flushed free, and accumulation of the carrier materials is prevented.

It is further advantageous if the first wall and the second wall are guided substantially parallel at least in sections. This forms at least one essentially even channel between them, through which water can flow quietly and with low turbulence.

It may be provided that the first wall and the second wall are spaced apart by between 5 cm and 40 cm, preferably between 15 cm and 30 cm, at least in the parallel sections. This is particularly advantageous as it allows a regular and laminar flow of water between the walls, but the flow resistance is low enough for sufficient water to flow through.

It is advantageous if the second wall and preferably also the first wall has at least one kink region along its height extension, wherein the second opening is arranged in this region, preferably directly below the kink region. In this sense, it is particularly advantageous if the second wall is steeper above the kink region than below the kink region. This increases the slope in the direction of the water level once a sufficient cross-section of the settling region has been reached. It is also advantageous if the first wall below the kink region is steeper than the second wall below the kink region, wherein the difference in slope between the first wall and the second wall is preferably between 3° and 10°, preferably 5°. As a result, the cross-section of the space between the walls increases downward from the kink. This can serve to create space for the sludge removal device located at the bottom.

To increase the distance from the first opening to the second opening, it may be provided that the first opening is offset from the second opening along the width dimension of the first wall system. This may further promote sinking of solids past the second opening and into lower portions of the channel system, thereby reducing solids in the water introduced into the settling region. The sinking solids can be fed via the channel system to the sludge removal device, for example.

A particularly simple embodiment variant provides for the outlet to be designed as an overflow. This means that there is no need to control a valve, but that the outlet takes place automatically as soon as the water level in the settling region exceeds a certain upper limit.

It is particularly advantageous that the sludge removal device has at least one third opening leading to the settling region and one fourth opening facing the aeration region. The third and fourth openings can extend essentially continuously over the entire width of the settling region.

The third opening and the fourth opening may be arranged one above the other and at least partially overlap. The third and fourth openings are thus arranged one above the other along a vertical axis. This causes easy removal of the solids-rich water, which can easily sink through the third and fourth openings.

In addition, a deflector can be arranged between the third opening and the fourth opening, which at least partially projects beyond the third opening. This prevents gas bubbles entering through the fourth opening from flowing through the third opening. Instead, they are preferably directed into the channel system and thus discharged.

The same applies if solids-rich water is led from the settling region into the channel system via a third opening of the sludge removal device and out of the channel system through a fourth opening through the first wall, wherein a deflector leads gas entering via the fourth opening away from the third opening.

In order to increase the water throughput through the channel system, it can be provided that several first openings are arranged at essentially the same height and that they are distributed essentially uniformly along a width extension of the wall system. This also allows the water to be removed from the aeration region as homogeneously as possible.

Further, it may be provided that a plurality of second openings are disposed at substantially the same height and they are substantially evenly distributed along a widthwise extension of the wall system.

It is particularly advantageous if the fourth opening and the vent opening are arranged horizontally offset from each other. It is essential that there is no vent opening below the fourth opening, i.e. the area below the fourth opening remains free of vent openings. This further reduces the risk of gas bubbles entering the channel system.

It is advantageous if the water level in the aeration region is kept higher than in the settling region during aeration. This can be achieved by continuously introducing gas through the aeration region. This favors the discharge of the solids-rich water from and the introduction of solids-poor water into the settling region.

It is particularly advantageous if the flow in the channel system is laminar at least in sections. This can be promoted on the one hand by the correct thickness and shape of the channels and on the other hand by smooth channel walls. The laminar flow can improve the settling of solids in the flow cross-section during flow. This facilitates the subsequent separation of the solids. At the same time, this promotes the rising of gas bubbles in the opposite direction in the parts of the flow cross-section with less solids.

BRIEF DESCRIPTION OF THE DRAWING

In the following, the present invention is explained in more detail with reference to a non-limiting embodiment variant shown in the FIGURE, wherein:

The FIGURE shows an embodiment of a clarifier of a sewage treatment plant according to the invention in section.

DETAILED DESCRIPTION

The FIGURE shows a part of a clarifier in a sectional view. An aeration region 1 and a settling region 2 are separated from each other by a wall system 3 designed as a double wall. The wall system 3 has a first wall 4 facing the aeration region 1 and a second wall 5 facing the settling region 2, which are connected via cross struts 20. The first and second walls 4, 5 extend across the entire width of the clarifier. The space between the first and second walls 4, 5 thus forms a channel system 8 with a continuous channel 9 from the water surface to the lower end of the walls 4, 5.

The first and second walls 4, 5 are composed of wall elements lined up along a width wall 7. These preferably extend over the entire height of the walls. This means that such a wall system 3 can easily be retrofitted in existing clarifiers, with the number of wall elements lined up depending on the design specifications, such as the required water flow rate and the maximum permissible upflow velocity.

In the area of a lower wall 21 of the clarifier, vent openings 6 through which air can be blown in are arranged over the entire longitudinal extension on a longitudinal wall of the clarifier in the aeration region 1. Only in the area of the width wall 7, where the wall system 3 is arranged, no vent opening 6 is provided. Thus, no vent opening 6 is arranged below a fourth opening 14.

The first and second walls 4, 5 are parallel in the upper area, about 20 cm apart and have a slope of 80°. Both the first wall 4 and the second wall 5 have a kink region 18 approximately in the middle of their height extension. Below this kink region 18, the first wall 4 has a slope of 65° and the second wall 5 has a slope of 60°. Thus the channel 9 becomes wider downwards from the kink region 18 and finally opens into a sludge removal device 10 at the lower end of the first and second walls 4, 5.

In the area of a minimum water level 22, the first wall 4 has a first opening 11, which connects the channel 8 with the aeration region 1. At the lower end of the first wall 4, the continuous fourth opening 14 is arranged, which is essentially horizontal, i.e. parallel to the water surface. The second wall 4 has below the first opening 11 and directly below the kink region 18 a second opening, namely a central opening 12, which connects the channel 9 with the settling region 2. At the lower end of the second wall 5, it also has a third opening 13, which likewise leads to the settling region 2. In this case, the third and fourth openings 14 are arranged parallel and directly above one another.

Between the third and fourth openings 13, 14, a deflector 15 is formed on the width wall 7, which has an upper surface 16 inclined at an angle to the third opening 13 and a lower surface 17 inclined at an angle to the fourth opening. The lower surface 17 thus projects beyond the third opening 13, whereby gas bubbles entering the channel system 3 via the fourth opening 14 are introduced into channel 9 by the lower surface 17. This prevents the gas bubbles from entering the settling region 2 via the third opening 13. Instead, the gas bubbles rise in channel 8 until they reach the water surface at the end of channel 8. The upper surface 16, on the other hand, serves to guide sinking solids past the lower surface 17 in the direction of the fourth opening 14. Both surfaces 16, 17 have slopes of 55° in different directions each.

A first guide member 23 is arranged on the underside of the first opening 11, which extends at an angle of about 45° from the first wall 4 into the aeration region 1. It is formed as a tongue resulting from the production of the first opening 11 in the first wall 4 as a remnant. If gas bubbles rise in the aeration zone 1 in the area of the first wall 4 and reach the first opening 11, the first guide member 23 prevents the gas bubbles from entering the channel system 8. A second guide member 24 is formed on the underside of the second, central opening 12, which is formed in the same way as the first guide member. It extends accordingly at an angle of about 45° from the second wall 5 into the channel 8. If gas bubbles rise in the channel 8, the second guide member 24 prevents the gas bubbles from entering the settling region 2.

An outlet 19 in the form of an overflow is arranged in the upper region of the settling region 2 near the minimum water level 22. It has outlet edges 30 which are arranged in such a way that no more water can flow off when the minimum water level 22 is reached.

As a result of the settling of the solids in the flow-calmed settling zone 2, roughly divisible zones are formed, indicated in the FIGURE by dashed lines. The clear zone 26 adjacent to the water level is characterized by very low-solids, clear water that can be readily processed. It is discharged via outlet 19 when the water level rises. Below this is the sedimentation zone 27, at the level of which the second opening 12 is also located. In this zone, the flow of the inflowing water is calmed and the solids sink. This zone has the highest solids gradient normal to the water surface. As a result, a sludge zone 28 forms underneath, which is characterized by a particularly high solids content. This solids-laden mixture is continuously discharged into the aeration region 1 through the third and fourth openings 13, 14. Thus, a particularly low solids separation of the clarified water is achieved, whereby the solids that positively participate in the clarification of the water remain in the clarifier and are mixed with newly supplied water, which is preferably fed into the aeration tank.

The first and second openings 11, 12 are designed as rectangular openings 10 cm by 10 cm, uniformly along the width extension of the walls 4, 5, wherein the second openings 12 are offset from the first openings 11 along the width extension of the walls 4, 5 and thus along the width wall 7. The third and fourth openings 13, 14 are designed to be continuous over the entire broad side of the clarifier and thus of the first and second walls 4, 5.

If gas is introduced via the vent openings 6, the volume and thus the water level in the aeration region 1 increases to a maximum water level 29. At the same time, the density in the aeration region 1 decreases, resulting in a pressure difference between the aeration region 1 and the settling region 2. This causes a flow from the aeration region 1 into the settling region 2, especially in the upper areas through the first opening 11 and via the channel 9 and the second opening 12. The rising of the level in the settling region 2 causes an overflow of the outlet edges 30, which leads to the discharge of the clear and clarified water of the clear zone 26. The flow from the first opening 11 to the second opening 12 forms laminar due to the uniform channel 8. This causes solids to accumulate in the flow cross-section in the area of the first wall 4 due to the slope of the walls 4, 5. On the one hand, this leads to a faster flow of low-solids water near the second wall 5 and, on the other hand, only a part of the accumulated solids passes through the second opening 12 when it is reached. The other part is further transported via the channel 8 in the direction of the sludge removal device 10 and leaves the channel system 8 via the fourth opening 14. This further reduces the solids input into the settling region.

The invention claimed is:

1. A Sewage treatment plant comprising:
   at least one clarifier including at least one aeration region with at least one vent opening configured and arranged to blow in oxygenous gas for mixing water to be clarified and at least one settling region with at least one outlet,
   at least one wall system that delimits the at least one aeration region from the at least one settling region by the at least one wall system (3) and wherein the at least one wall system has a channel system which has at least one first opening leading to the at least one aeration region in the region of the water level and a sludge removal device of the channel system in the region of a lower wall of the clarifier and configured and arranged for transporting solids-rich water from the at least one settling region into the aeration region, wherein the sludge removal device has at least one third opening leading to the at least one settling region and a fourth opening facing the aeration region, wherein the channel system has a central opening leading to the settling region below the at least one first opening and above the sludge removal device, wherein the first opening, the central opening, and the sludge removal device are connected with each other via the channel system.

2. The sewage treatment plant according to claim 1, characterized in that the at least one wall system is a double wall, and in that the at least one first opening is arranged on a first wall facing the at least one aeration region and the central opening is arranged on a second wall facing the at least one settling region.

3. The sewage treatment plant according to claim 2, characterized in that the at least one first opening comprises a retaining grid.

4. The sewage treatment plant according to claim 1, characterized in that the central opening is arranged at the level of a sedimentation zone of the at least one settling region.

5. The sewage treatment plant according to claim 1, further including a first guide member arranged in the region of the at least one first opening and below the at least one first opening, wherein the first guide member extends away from the at least one wall system and in the direction of the at least one aeration region.

6. The sewage treatment plant according to claim 2, further including a second guide member arranged in the region of the central opening and at least below the central opening, wherein the second guide member extends away from the at least one wall system and in the direction of the first wall.

7. The sewage treatment plant according to claim 2, characterized in that the first wall and the second wall are guided substantially parallel at least in sections.

8. The sewage treatment plant according to claim 7, characterized in that the first wall and the second wall are spaced apart at least in the parallel sections from each other by between 5 cm and 40 cm.

9. The sewage treatment plant according to claim 2, characterized in that the second wall has at least one kink region along its height extension, wherein the central opening is arranged in the region of the at least one kink region.

10. The sewage treatment plant according to claim 9, characterized in that the second wall is steeper above the at least one kink region than below the at least one kink region.

11. The sewage treatment plant according to claim 9, characterized in that the first wall, below the at least one kink region, is steeper than the second wall below the at least one kink region, wherein the difference of the slope between the first wall and the second wall is between 3° and 10°.

12. The sewage treatment plant according to claim 1, characterized in that the at least one first opening is arranged offset from the central opening along the width extension of the at least one wall system.

13. The sewage treatment plant according to claim 1, characterized in that the outlet is configured and arranged to function as an overflow.

14. The sewage treatment plant according to claim 1, characterized in that the at least one third opening and the fourth opening are arranged one above the other and at least partially overlap.

15. The sewage treatment plant according to claim 14, further including a deflector arranged between the at least one third opening and the fourth opening, the deflector is configured and arranged to project at least partially beyond the at least one third opening.

16. The sewage treatment plant according to claim 1, wherein the at least one first opening includes a plurality of first openings arranged at substantially the same height and they are distributed substantially uniformly along a width extension of the at least one wall system.

17. The sewage treatment plant according to claim 1, further including a plurality of central openings arranged at substantially the same height and distributed substantially uniformly along a width extension of the at least one wall system.

18. The sewage treatment plant according to claim 1, characterized in that the fourth opening and the at least one vent opening are horizontally offset from each other.

19. The sewage treatment plant according to claim 2, characterized in that at least the second wall, at least below the central opening, has a slope between 50° and 70°.

20. A method for operating a sewage treatment plant including the following steps:
aerating water to be clarified in at least one clarifier in an aeration region,
settling the water in a settling region delimited from the aeration region,
discharging the water via an outlet in the settling region,
guiding water for this purpose from the aeration region via a first opening in a channel system into the settling region, the first opening being disposed at a location below a level of the water in the aeration region,
transporting solids in the water guided via the first opening to a sludge removal device via the channel system;
transporting solids-rich water from the settling region into the aeration region via the sludge removal device of the channel system,
conveying solids-rich water from the settling region into the channel system via a third opening of the sludge removal device and out of the channel system through a fourth opening through a first wall, and
directing gas entering via the fourth opening away from the third opening via a deflector, wherein the near-surface water is guided into the settling region via a central opening below the first opening and above the sludge removal device.

21. The method according to claim 20, wherein the step of aeration further includes maintaining a water level in the aeration region that is higher than in the settling region.

22. The method according to claim 20, further including the step of introducing water through the central opening into a sedimentation zone of the settling region.

23. The method according to claim 20, characterized in that flow within the channel system is laminar at least in sections.

* * * * *